United States Patent
Skipper et al.

(10) Patent No.: US 8,582,871 B2
(45) Date of Patent: Nov. 12, 2013

(54) METHODS AND LOGIC FOR AUTONOMOUS GENERATION OF ENSEMBLE CLASSIFIERS, AND SYSTEMS INCORPORATING ENSEMBLE CLASSIFIERS

(75) Inventors: Julie A. Skipper, Dayton, OH (US); Priya Ganapathy, Los Angeles, CA (US)

(73) Assignee: Wright State University, Dayton, OH (US)

(*) Notice: Subject to any disclaimer, the term of this patent is extended or adjusted under 35 U.S.C. 154(b) by 540 days.

(21) Appl. No.: 12/898,916

(22) Filed: Oct. 6, 2010

(65) Prior Publication Data

US 2011/0081073 A1    Apr. 7, 2011

Related U.S. Application Data (60) Provisional application No. 61/249,056, filed on Oct. 6, 2009.

(51) Int. Cl.
*G06K 9/62*    (2006.01)

(52) U.S. Cl.
USPC .............................. 382/159; 706/12

(58) Field of Classification Search
USPC ............... 706/12, 14, 15, 45, 48, 56
See application file for complete search history.

(56) References Cited

U.S. PATENT DOCUMENTS

| | | | | |
|---|---|---|---|---|
| 5,561,431 A * | 10/1996 | Peele et al. | ....................... | 342/90 |
| 6,950,812 B2 * | 9/2005 | Suermondt et al. | ............. | 706/48 |
| 7,043,468 B2 * | 5/2006 | Forman et al. | ................... | 706/46 |
| 7,337,086 B2 * | 2/2008 | Guralnik et al. | .............. | 702/113 |
| 2011/0172514 A1 * | 7/2011 | Lee et al. | ...................... | 600/408 |

OTHER PUBLICATIONS

Chakraborty, Dev P., "Maximum Likelihood Analysis of Free-Response Receiver Operating Characteristic (FROC) Data," Med. Phys., 16(4) 561-568 (1989).

(Continued)

*Primary Examiner* — Samir Ahmed
(74) *Attorney, Agent, or Firm* — Dinsmore & Shohl LLP (57) ABSTRACT

In one embodiment, a method for generating an ensemble classifier may include transforming multidimensional training data into a plurality of response planes. Each of the response planes includes a set of confidence scores. The response planes are transformed into a plurality of binary response planes. Each of the binary response planes include a set of binary scores corresponding to one of the confidence scores. Combinations of the binary response planes are transformed into sets of diversity metrics according to a diversity measure. A metric is selected from the sets of diversity metrics. A predicted performance of a child combination of the recognition algorithms corresponding to the combinations is generated. The predicted performance is based at least in part upon the metrics. Parent recognition algorithms are selected from the recognition algorithms based at least in part upon the predicted performance. The ensemble classifier is generated and includes the parent recognition algorithms.

17 Claims, 4 Drawing Sheets

(56) References Cited

OTHER PUBLICATIONS

Ganapathy, Priya, et al., "A novel ROC Approach for Performance Evaluation of Target Detection Algorithms," Dept. of Biomedical, Industrial and Human Factors Engineering, Wright State University.
Giacinto, Giorgio, et al., "Design of Effective Neural Network Ensembles for Image Classification Purposes," Dept. of Electrical and Electronic Eng., University of Cagliari, Italy; pp. 1-23.
Kang, Hee-Joong, et al., "Dependency Relationship Based Decision Combination in Multiple Classifier Systems," Computer Science Department and Center for Artificial Intelligence Research, Korea Advanced Institute of Science and Technology, 373-1 Kusong-dong Yosong-gu Taejon 305-701, Korea.
Oza, Nikunj, et al., "Classifier Ensembles: Select Real-World Applications," Elsevier, ScienceDirect, Information Fusion 9 (2008) 4-20.
Ruta, Dymitr, et al., "Classifier Selection for Majority Voting," Elsevier, ScienceDirect, Information Fusion 6 (2005) 63-81.
Tilie, Sorin, et al., "Fusion of Complementary Detectors for Improving Blotch Detection in Digitized Films," Elsevier, ScienceDirect, Pattern Recognition Letters 28 (2007) 1735-1746.
Valin, Pierre, et al, "Comparative Implementation of Two Fusion Schemes for Multiple Complementary FLIR Imagery Classifiers," Elsevier, ScienceDirect, Information Fusion 7 (2006) 197-206.
Ayrulu, Birsel, et al., Reliability Measure Assignment to Sonar for Robust Target Differentiation, Pergamon, Pattern Recognition 35 (2002) 1403-1419, Revised Aug. 29, 2000; accepted May 23, 2001.
Barandela, R., et al., "New Applications of Ensembles of Classifiers," Pattern Anal Applic (2003) 6: 245-256; Received Jul. 23, 2002/Accepted Apr. 1, 2003 @Springer-Verlag London Limited 2003.
Bruzzone, L., et al., "Detection of Land-Cover Transition by Combining Multidate Classifiers," Science Direct, Pattern Recognition Letters 25 (2004) 1491-1500.
Cover, T.M., et al, "Nearest Neighbor Pattern Classification," IEE Transactions of Information Theory, vol. IT-13, No. 1, Jan. 1967, 21-27.
Cremer, F., et al, "A Comparison of Decision-Level Sensor-Fusion Methods for Anti-Personnel Landmine Detection," Information Fusion 2 (2001) 187-208.
Dubois, Didier, (1988) Representation and Combination of Uncertainty With Belief Functions and Possibility Measures. Comput. Intell., 4, 244-264.
Duda R., et al., (1973), "Pattern Recognition and Scene Analysis," John Wiley & Sons, Inc., Hoboken, NJ, p. 10-33.
Fawcett, Tom, (2006) "An Introduction to ROC Analysis", Science Direct, Pattern Recognition Letters 27, p. 861-874.
Gatnar, Eugeniusz, (2008) Fusion of Multiple Statistical Classifiers: Data Analysis, Machine Learning and Applications, Springer-Verlag, New York, 19-27.
Gautherie, Michel, Ph.D., (1983) "Thermobiological Assessment of Benign and Malignant Breast Diseases", Gynecology, From the Laboratory of Thermobiology, University Louis Pasteur School of Medicine, Strasbourg, and the National Institute for Health and Medical Research (INSERM), Paris, 861-869.
Hall, David L., et al., "An Introduction to Multisensor Data Fushion," Proceedings of the IEEE, vol. 85, No. 1; Jan. 1997, 6-22.
Karvir, H., et al., (2007) "A Power Spectrum Weighted Edge Analysis for Straight Edge Detection in Images," Visual Information Processing XVI, Proc. of SPIE—Defense and Security Symposium, Orlando, FL 6575-07, 1-8.
Karvir, R., et al., (submitted 2008) A Robust and Computationally Efficient Mutual Information-Based Multimodal Image Registration Algorithm.
Kegelmeyer, W. Philip, et al., "Computer-aided Mammographic Screening for Spiculated Lesions," Radiology 1994; 191: 331-337.
Kim, Eunju, et al., (2002) "Combination of Multiple Classifiers for the Customer's Purchase Behavior Prediction," Decision Support Systems 34 167-175.
Kittler, Josef, et al., "On Combining Classifiers," IEEE Transactions on Pattern Analysis and Machine Intelligence, vol. 20 No. 3, Mar. 1998.
Kohavi, Ron, et al. (1996) "Bias Plus Variance Decomposition for Zero-One Loss Functions," PROC 13th International Conference on Machine Learning, San Mateo, CA 275-283.
Kong, Seong G., et al., "Recent Advances in Visual and Infrared Face Recognition—A Review," Science Direct Computer Vision and Image Understanding 97 (2005) 103-135.
Kuncheva, L (2003) "Measures of Diversity in Classifier Ensembles and Their Relationship with the Ensemble Accuracy," Machine Learning, 51, 181-207.
Kuncheva, L., (2000) Fuzzy classifier design: Studies in Fuzziness and Soft Computing, Springer Verlag, New York, 301.
Lam, Louisa, et al., (1995), "Optimal Combinations of Pattern Classifiers," Pattern Recognition Letters 16 (1995) 945-954.
Lauria, A., et al, (2005) "A Study of Two Different CAD Systems for Mammography As an Aid to Radiological Diagnosis in the Search of Microcalcification Clusters," Eur. J. Radiol., 55, 264-269.
Liu, Cheng-Liu, (2005) "Classifier Combination Based on Confidence Transformation," Science Direct, Pattern Recognition, 38 (2005) 1-28.
Liu, Gang, et al., "Optimal Matching Problem in Detection and Recognition Performance Evaluation," Pattern Recognition 35 (2002) 2125-2139.
Metz, Charles E., (2006) "Receiver Operating Characteristic Analysis: A Tool for the Quantitative Evaluation of Observer Performance and Imaging Systems," J. Am. Coll. Radiol., 3, 413-422.
Meyer, David, et al., "The Support Vector Machine Under Test," ComputerScienceWeb.com; Science Direct, Neurocomputing 55 (2003) 169-186.
Perlovsky, Leonid I., et al., "Multi-sensor ATR and Identification of Friend or Foe Using MLANS," Neural Networks, vol. 8, No. 7-8, pp. 1185-1200, 1995.
Philippe Smets, (1990) "The Combination of Evidence in the Transferable Belief Model," Universite Libre de Bruxelles, Comb.Ev. Jul. 27, 1999 11:41, 1-36.
http://www.army.forces.gc.ca., accessed on Jun. 20, 2008.
Richard J, et al, (2006) Remote Sensing Digital Image Analysis: An Introduction, Springer-Verlag, New York, 10-18.
Rizvi, Syed A., et al., "Fusion of FLIR Automatic Target Recognition Algorithms," Science Direct, Information Fusion 4 (2003) 247-258.
Rombaut, Michele, et al., "Study of Dempster—Shafer Theory for Image Segmentation Applications," Image and Vision Computing 20 (2002) 15-23.
Russ, J. (2002) The Image Processing Handbook, CRC Press., Boca Raton, FL. 505-507.
Schrider, Christina Da-Wann, "Histogram-Based Template Matching Object Detection in Images With Varying Brightness and Constrast," B.S., Wright State University, 2005, thesis.
Serpen, G., et al., "A Knowledge-Based Artificial Neural Network Classifier for Pulmonary Embolism Diagnosis," Elsevier, Comparison in Biology and Medicine 28 (2008) 204-220.
Shafer, G. (1976) "A Mathematic Theory of Evidence," Princeton University Press, Princeton, New Jersey, 12-68.
Sharkey, Amanda, et al., (1997) "Combining Diverse Neural Nets," The Knowledge Engineering Review, 10(4), 379-385.
Shipp, Catherine A., "Relationships Between Combination Methods and Measures of Diversity in Combing Classifiers," Elsevier, Information Fusion 3 (2002) 135-148.
Skalak, David B., (1996) "The Sources of Increased Accuracy for Two Proposed Boosting Algorithms," Neural Networks, 7(5), 777-781.
Tamura, Hideyuki, et al., "Textural Features Corresponding to Visual Perception," IEEE Transactions on Systems, Man and Cybernetics, vol. SMC-8, No. 6, Jun. 1978.
Wilson, Clay, "Improved Explosive Devices (IEDs) in Iraq and Afghanistan: Effects and Countermeasures," CRS Report for Congress, Updated Aug. 28, 2007.
Windeatt, Terry, "Diversity Measures for Multiple Classifier System Analysis and Design," Elsevier, Science Direct, Information Fusion 6 (2005) 21-36.

(56) References Cited

OTHER PUBLICATIONS

Xu, Lei, et al., (1992) "Methods of Combining Multiple Classifiers and Their Applications to Handwriting Recognition," IEEE Transactions on Systems, Man and Cybernetics, vol. 22 (3), 418-434.

Zelic, Igor, et al., "Induction of Decision Trees and Bayesian Classification Applied to Diagnosis of Sport Injuries," Journal of Medical Systems, vol. 21, No. 6, pp. 429-444.

http://www.globalsecurity.org.accessed on Jan. 5, 2008.

Ganapathy, P., et al., (Submitted 2008) "A Novel Receiver Operating Characteristic (ROC) Algorithm for Performance Evaluation of Computer Aided Detection (CAD) Systems".

Clay, W. (2007) Improvised Explosive Devices in Iraq and Afganistan: Effects and Countermeasures. CRS Report for Congress, 1-6.

Klein L. (2004) Data and sensor fusion: A tool for information assessment and decision making. SPIE Press, Bellingham, Washington, 135-171.

\* cited by examiner

METHODS AND LOGIC FOR AUTONOMOUS GENERATION OF ENSEMBLE CLASSIFIERS, AND SYSTEMS INCORPORATING ENSEMBLE CLASSIFIERS

CROSS-REFERENCE TO RELATED APPLICATIONS

This application claims the priority benefit under 35 U.S.C. §119 from U.S. Provisional Application No. 61/249,056, filed Oct. 6, 2009, entitled "METRIC AND PROCESS FOR AUTONOMOUS ASSESSMENT OF MULTIPLE CLASSIFIER SYSTEMS," the entire contents of which are hereby incorporated by reference.

TECHNICAL FIELD

The present specification generally relates to classification/recognition systems and methods, and more particularly to a methods and logic for autonomous generation of ensemble classifiers, such as, for object detection, and systems incorporating the same.

BACKGROUND

Classification and recognition algorithms have been developed to detect specific or distinct signatures of targets within an array of data. The detection capability of the classification/recognition algorithms may be limited by variations in environmental conditions, sensor settings, scene complexity and degree of clutter. Individual classification/recognition algorithms may be combined to form an ensemble classifier. The ensemble classifier may have improved detection performance relative to the detection performance of an individual classification/recognition algorithm. The improved performance for detecting regions of interest such as, for example, military targets, or malicious cells/lesions or patterns, depends upon the selection of algorithms for use in the ensemble classifier.

However, a detection system may include a sensor that receives analysis data, a machine readable medium communicably coupled to the sensor, an ensemble classifier stored on the machine readable medium, and a processor communicably coupled to the sensor. The ensemble classifier includes parent recognition algorithms having a predicted performance of a low dependency, such that the predicted performance is a function of a minimum double-fault measure of a recognition algorithm. The processor executes the ensemble classifier to detect a target within the analysis data.

Accordingly, a need exists for alternative methods and logic for and systems for generating an ensemble classifier, and systems comprising an ensemble classifier.

SUMMARY

In one embodiment, a method for generating an ensemble classifier may include transforming, automatically with a processor, multidimensional training data into a plurality of response planes according to a plurality of recognition algorithms. Each of the response planes includes a set of confidence scores. The response planes are transformed, automatically with the processor, into a plurality of binary response planes. Each of the binary response planes include a set of binary scores corresponding to one of the confidence scores. A first combination of the binary response planes are transformed, automatically with the processor, into a first set of diversity metrics according to a first diversity measure. A second combination of the binary response planes are transformed, automatically with the processor, into a second set of diversity metrics according to a second diversity measure. A first metric is selected from the first set of diversity metrics. A second metric is selected from the second set of diversity metrics. A predicted performance of a child combination of the recognition algorithms corresponding to the first combination and the second combination is generated, automatically with the processor. The predicted performance is based at least in part upon the first metric and the second metric. Parent recognition algorithms are selected from the recognition algorithms based at least in part upon the predicted performance. The ensemble classifier is generated and includes the parent recognition algorithms.

In another embodiment, a logic for generating an ensemble classifier stored on a machine readable medium may include: a receiver-operator characteristic algorithm for generating a receiver-operator characteristic curve for a first two-dimensional image detection algorithm; an area algorithm for generating a first area under a receiver-operator characteristic curve for the first two-dimensional image detection algorithm; a predictive model to estimate a second area under a receiver-operator characteristic curve the ensemble classifier from a first diversity metric of the first two-dimensional image detection algorithm and a second diversity metric of a second two-dimensional image detection algorithm; and a weighting algorithm for combining the first two-dimensional image detection algorithm and the second two-dimensional image detection algorithm, wherein outputs of the first two-dimensional image detection algorithm and the second two-dimensional image detection algorithm are exponentially weighted.

In yet another embodiment, logic for generating an ensemble classifier stored on a machine readable medium may include: a receiver-operator characteristic algorithm for generating a receiver-operator characteristic curve for a first two-dimensional image detection algorithm; an area algorithm for generating a first area under a receiver-operator characteristic curve for the first two-dimensional image detection algorithm; a predictive model to estimate a second area under a receiver-operator characteristic curve the ensemble classifier from a first diversity metric of the first two-dimensional image detection algorithm and a second diversity metric of a second two-dimensional image detection algorithm; and a weighting algorithm for combining the first two-dimensional image detection algorithm and the second two-dimensional image detection algorithm, wherein outputs of the first two-dimensional image detection algorithm and the second two-dimensional image detection algorithm are exponentially weighted.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

It is against the above background that embodiments of the present disclosure are capable of accepting any algorithm's output termed herein as a response plane. The response planes can be spatially encoded and accurately associated with the different regions of interest of a given input image. Each algorithm may measure and/or extract a different feature from a given region of interest. To allow a meaningful comparison of different algorithms and effectively combine their respective response planes, a transformation from the algorithm-specific measurement space to a universal confidence space may be performed. Here, the term "confidence" refers to the degree of certainty associated with the decision for a given region of interest. For example, a decision may identify a target or non target with a numeric value (e.g., a gray scale image may have a confidence between 0 and 255). Embodiments of the present disclosure may map measured regions of interest to confidence scores based on training multidimensional data such as, for example, ground truth data.

Figure 1:
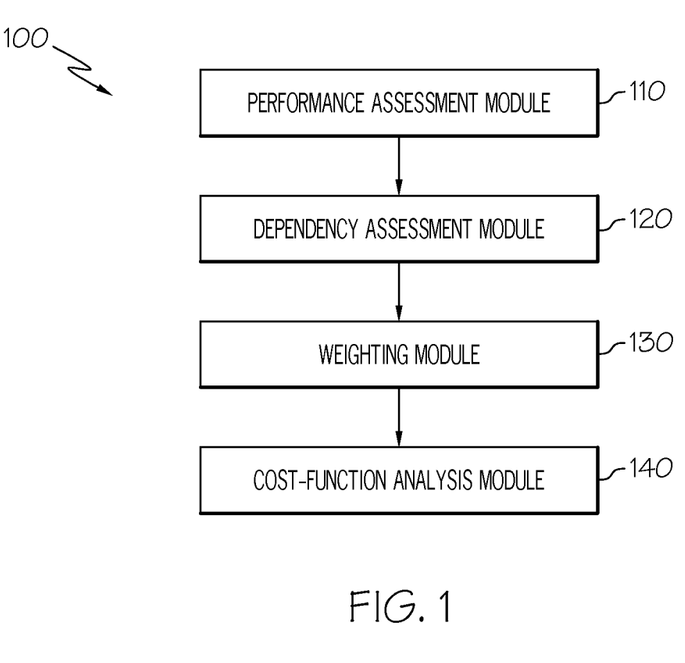
FIG. 1 schematically depicts a framework for the autonomous generation of an ensemble classifier according to one or more embodiments shown and described herein.

As depicted in FIG. 1, embodiments of the methods and logic generally comprise a framework with the following in-built modules: a performance assessment module that evaluates performance of individual algorithms; a dependency assessment module that assess interdependencies between the independent algorithms to arrive at rank-ordered (based on projected performance) ensemble classifiers under a particular fusion scheme; a weighting module that combines the individual algorithms into an ensemble classifier with, optionally, derived weights; and, a cost function analysis module that evaluates the performance of the ensemble classifier. Each of the in-built modules is discussed in further detail hereafter.

Referring to FIG. 1, the framework 100 comprises a performance assessment module 110 that evaluates detection algorithms such as, for example, frequency-based algorithms, edge based algorithms, histogram-based algorithms, variance-based algorithms, shape-based algorithms, and the like. The detection algorithms are evaluated with receiver-operator characteristic curve analysis to quantify true detections, false alarm rates, and missed detection rates. The receiver-operator characteristic algorithm, described herein, provides an unbiased and computationally efficient estimation of the false detection rate at different decision thresholds.

Figure 2:
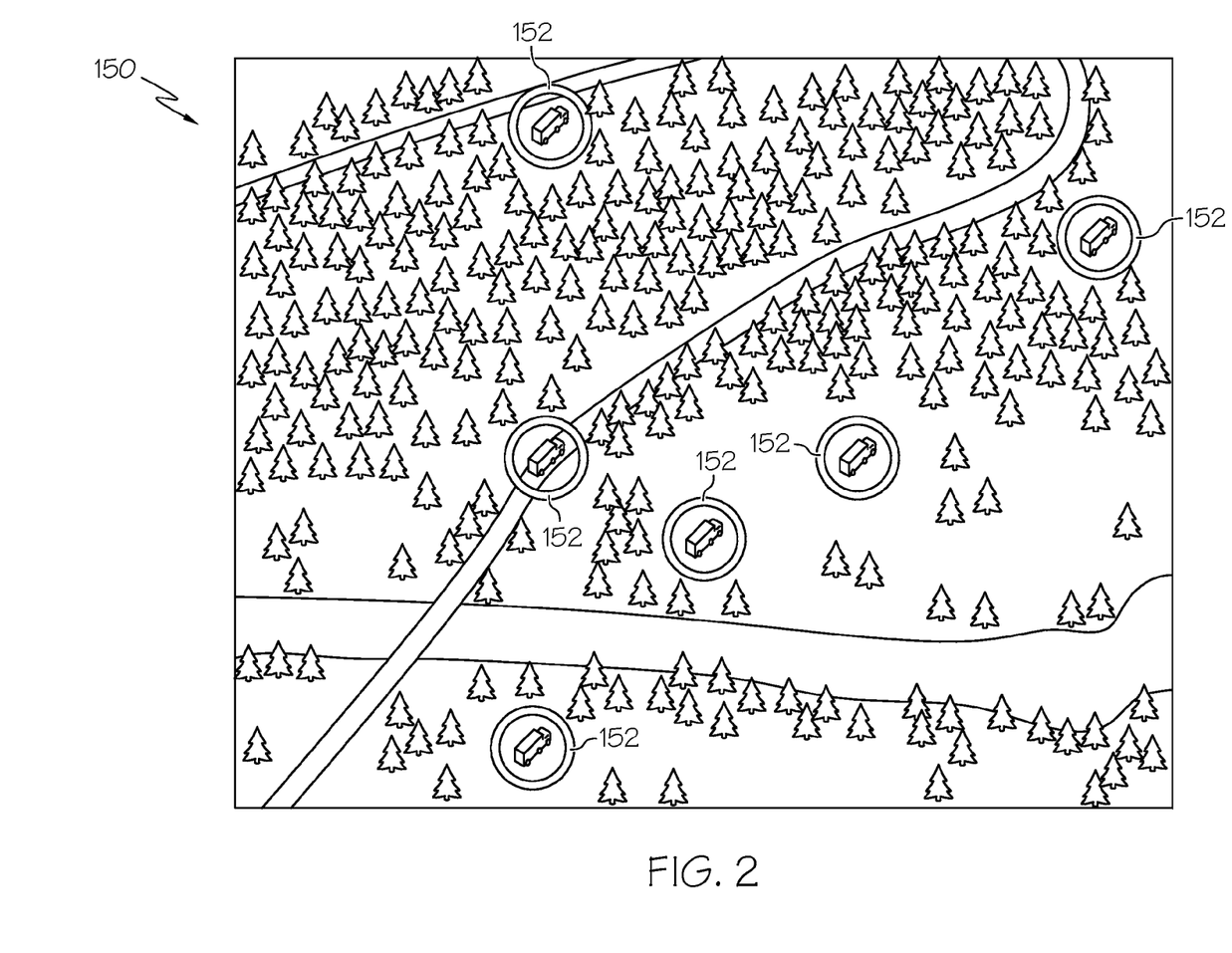
FIG. 2 schematically depicts ground truth data according to one or more embodiments shown and described herein.

Referring to FIG. 2, the unbiased evaluation is achieved by quantifying the true negatives. For example, in algorithms that detect targets in an image, the true negative is the entire image excluding the targets. Ground truth data 150 is utilized as training multidimensional data to generate the unbiased evaluation. Ground truth data includes information regarding the locations (e.g., pixel coordinates) and size of targets 152.

Figure 3A:
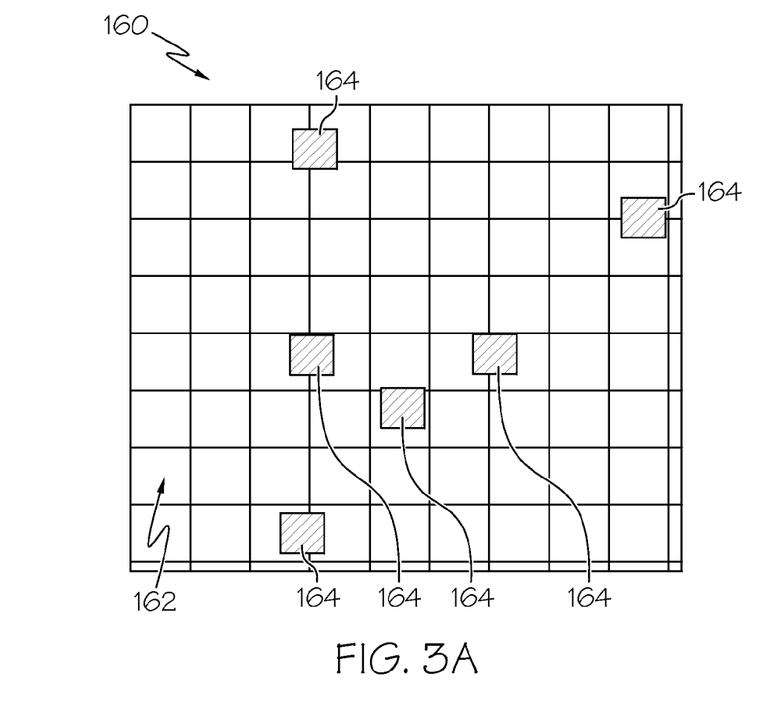
FIG. 3A schematically depicts a true negative template image according to one or more embodiments shown and described herein.
Figure 3B:
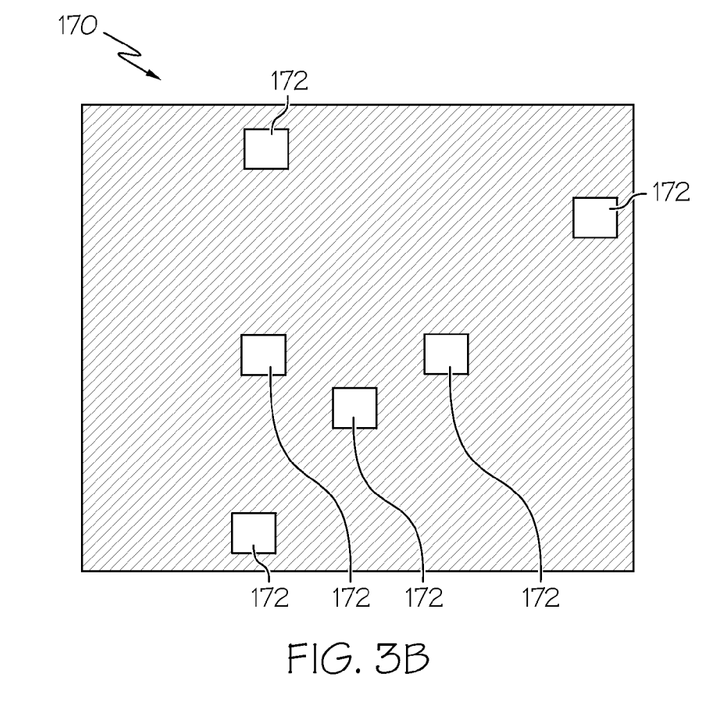
FIG. 3B schematically depicts a true negative template image according to one or more embodiments shown and described herein.

Referring collectively to FIGS. 2, 3A and 3B, the ground truth data 150 can be converted into a true negative template image 160. The true negative template image 160 is generated by dividing the ground truth data 150 into grid squares 162. The total number of true negative grid squares is determined by excluding the grid squares 162 that correspond to target locations 164. The true negative template image 160 represents the background and non-target objects. The ground truth data 150 can be converted into a true positive template image 170. Target locations 172 are represented by grid squares of a size corresponding to the target type.

Response planes of individual detection algorithms generated from ground truth data 150 can be analyzed to quantify true detection and false alarm rates of the detection algorithms. For example, the detection algorithms may generate response planes with confidence scores across regions of interest indicative of the detection of a target 152. For example, the confidence values range from 0 to 255 for an 8-bit representation of a grayscale response plane, where 0 and 255 represent the minimum and maximum score of locating a target, respectively. The response plane is transformed into a binary response plane by thresholding the each confidence score at a threshold value (e.g., confidence scores above the threshold are converted to a true or a 1, and confidence scores below the threshold are converted to a false or a 0). The number of detected targets and the sensitivity at the given threshold are determined based on the overlap between the binary response plane and the true positive template image 170. Regions of interest that contribute to the sensitivity calculation are removed from the binary response plane. The remaining regions of interest, i.e., the false positives, are counted by considering the overlap between the true negative template image 160 and the binary response plane. Specificity is computed based on the counted false positives and the total number of true negative grid squares 162.

The threshold may be incrementally increased over the entire range of possible confidence scores (e.g., from 0 to 255) with receiver-operator characteristic curve components computed at each threshold. The receiver-operator characteristic curve is generated by plotting sensitivity vs. 1-specificity across the thresholds, and the area under the receiver-operator characteristic curve is computed using the trapezoidal rule of integration.

The size of the grid squares 162 (e.g., grid square dimension of height and/or width) in the true negative template image 160 may determine whether or not the specificities obtained across the range of thresholds are accurate estimates of the actual underlying specificities. Dividing the template into smaller or larger grid squares overestimates or underestimates specificity, respectively. An optimizer may select an optimal grid squares size such that the computed specificities accurately reflect changes in response plane due to a change in thresholds. To reduce under-sampling or over-sampling errors, an average size of the targets 152 in the ground truth data 150 (an average dimension rather than the largest or smallest target size) can be selected as a starting point to optimize the size of the grid squares 162 in the true negative template image 160. It is noted that the upper limit of the size of the grid squares 162 in the true negative template image 160 is dependent on the total size of the image. Thus, the size of the grid squares 162 in the true negative template image 160 should be selected such that substantial variation across specificities results from a change in threshold.

It is noted that, while the generation of receiver-operator characteristic curves and the area under the receiver-operator characteristic curves for detection algorithms for two-dimensional (2D) images are described herein, the above described receiver-operator characteristic curves and the area under the receiver-operator characteristic curves may be utilized to evaluate detection algorithms for any type of multidimensional/multifeature data. The above described analysis may be extended to other detection problems such as, for example, face recognition, handwriting recognition, or medical image analysis, because the embodiments described herein are extensible to assess any type of classification and/or recognition that may be trained using a set of training multidimensional/multifeature data (e.g., ground truth data).

For complex detection/classification problems algorithm performance is frequently dependent upon the initial parameter settings deduced from training image evaluation. Any variation between the training data and actual implementation in terms of environmental conditions, sensor settings, scene complexity, degree of clutter, and the like results in suboptimal performance of an algorithm. The overall performance of a detection system can be improved by using an ensemble of classifiers with a low amount of dependency, i.e., a low amount of overlap in classifying errors made by a set of algorithms on given training data.

Referring again to FIG. 1, the framework 100 comprises a dependency assessment module 120 that quantifies the dependency between detection algorithms that may be combined to form an ensemble classifier. The capability of the ensemble classifier to outperform an individual detection algorithm depends upon the independence of the candidate detection algorithms. Therefore, metrics that predict the degree of dependency between detection algorithms and provide a correlation with the area under the receiver-operator characteristic curve may be employed to select candidate detection algorithms for use in an ensemble classifier.

The degree of dependency between detection algorithms can be predicted by diversity metrics such as, for example, Q statistics, double-fault measure, correlation coefficient, product-moment correlation measure, disagreement measure, or any other pair-wise diversity measure. The diversity metrics consider correct classifications, coincident and/or complementary errors between two given detection algorithms. The diversity metrics may be extended to evaluate more than two detection algorithms by averaging the diversity metric across all pairs of detection algorithms within the ensemble. With averaging, information regarding the complementary or coincident errors between more than two classifiers in the given ensemble may be lost. Non-pair-wise diversity metrics can overcome this limitation by adopting error representations that can be applied on the whole ensemble. Non-pair-wise diversity metrics such as the entropy measure, which computes the level of disagreement, and the Kohavi-Wolpert variance measure, which calculates the variability in the predicted class for a given sample amongst all classifiers within the ensemble, may be utilized in the embodiments described herein.

In one embodiment, a double-fault measure may be calculated to determine the independence of two individual detection algorithms. In general, the double-fault measure takes into account the coincident errors between only two algorithms at a time. However, the double fault measure may be extended, as is described in greater detail herein, to calculate the overall dependency among all algorithms in a given combination. For example, given a set of five algorithms, the double-fault measure may be extended to estimate the dependence for the 26 possible combinations of the algorithms, including 16 ensembles having more than two algorithms, by treating an ensemble as a single algorithm. For example, the double-fault measure for three algorithms A, B and C may be calculated by calculating the double-fault measure for A and B, and then calculating the double-fault measure for the combined AB and the individual algorithm C. The double-fault measure (double fault dependency metric) is the ratio of the total number of samples misclassified as false positive or false negatives by both algorithms given by $$F2_{12} = \frac{N^{00}}{N^{11} + N^{10} + N^{01} + N^{00}}, \quad (1)$$

where the subscripts 1 and 2 represent the pair of algorithms for which the double-fault measure is computed, $N^{11}$ is the total number of samples correctly classified, $N^{00}$ is the total number of samples misclassified by both algorithms, and $N^{10}$ and $N^{01}$ are the number of samples correctly classified by only algorithm 1 and algorithm 2, respectively.

Conventionally, the double-fault measure is computed between any two algorithms (or classifiers) whose output or response planes are binary in nature. However, the combined response plane for algorithms that generate response planes comprising confidence scores will vary within a range values (e.g., grayscale values from 0-255 for an 8-bit image). The double-fault measure cannot accurately predict the true performance of a combined classifier by simply converting the confidence scores of the individual response planes to a binary response plane (i.e., any grayscale value greater than a threshold is set to 1; all remaining values are set to 0) and calculating the coincident overlap (i.e., logical 'AND' operation) of each binary response plane with the true positive template image 170 and the true negative template image 160. For example, the fact that a target was undetected, i.e., its corresponding pixels are turned 'off' in the response plane of both algorithms at a given threshold, does not guarantee that target will not be detected at the same threshold in the combined classifier. Similarly, the fact that a target was detected in both algorithms at a threshold does not guarantee that the target will be detected by the combined classifier at that threshold.

The performance of the combined classifier is dependent upon the mathematical formulation of the combination scheme followed to generate the combined classifier. To capture the true changes in the response plane of the combined classifier and provide an accurate double-fault measure estimate at each threshold, the following conditional statements with respect to linear averaging based fusion scheme (2), Naive Bayes based fusion scheme (3) and Dempster-Shafer theory based fusion scheme (4) combination rules can be applied for a given threshold.

$$\text{If } X_{0 \to 255} \leq \frac{g_1(i,j) + g_2(i,j)}{2} \quad (2)$$
then resultant response plane $(i, j) = 1$; else $= 0$.

$$\text{If } X_{0 \to 255} \leq g_1(i,j) \times g_2(i,j) \quad (3)$$
then resultant response plane $(i, j) = 1$; else $= 0$.

$$\text{If } \frac{X_{0 \to 255}}{g_2(i,j)} \leq \frac{g_1(i,j)}{g_2(i,j)} + \frac{b_1(i,j)}{255} \quad (4)$$
then resultant response plane $(i, j) = 1$; else $= 0$.

In the above conditional statements, X represents a threshold which is varied from 0 to the bit depth (i.e., 255 for an 8-bit gray scale image), $g_1(i, j)$ is the confidence score at spatial location (i,j) of the response plane corresponding to the first algorithm, $g_2(i, j)$ is the confidence score at spatial location (i,j) of the response plane corresponding to the second algorithm, and $b_1(i, j)$ is the mass function for the ignorant class of the first algorithm.

The double-fault measure can be calculated for each binary response plane obtained based on conditional statements (2) (3) and (4), respectively, across thresholds from 0 to bit depth. The double fault-measure may be extended to cases where classifiers comprise more than two algorithms, e.g., for classifier PQRS, $g_1(i, j)$ and $g_2(i, j)$ can be defined as the confidence scores corresponding to a parent ensemble PQR, and the individual algorithm S, respectively. Computing a double-fault measure across each threshold yields a range of double-fault measure values as opposed to a single double-fault measure value.

A correlation exists between the area under the receiver-operator characteristic curve value and the minimum of a double-fault measure value. That is, the minimum of the double-fault measure values may be consistently and highly correlated with the area under the receiver-operator characteristic curve values. Therefore, for all combination schemes the minimum of the double-fault measure can be used as a surrogate metric for classifier selection, i.e., estimation of the area under the receiver-operator characteristic curve values. Specifically, experimental results demonstrated high correlation between the minimum of the double fault measure values and the receiver-operator characteristic curve values.

An empirical predictive model to compute the area under the receiver-operator characteristic curve for a new child ensemble classifier from the minimum double-fault measure measured between its parent classifiers can be developed. For example, a second-degree polynomial model (quadratic model) may be developed based on a degree of fit analysis. The polynomial model may be used to estimate the area under the receiver-operator characteristic curve value of a child classifier from the minimum double-fault measure value between the corresponding parent classifiers for a given evaluation image under each of the three fusion schemes. The results were experimentally verified and demonstrated an $R^2$ value from about 0.83 to about 0.87 for any given new classifier. The difference between the average estimated and computed area under the receiver-operator characteristic curve values was determined to be less than about 1.5%.

Determining the minimum double-fault measure value by calculating double-fault measure values across the entire range of thresholds may require about the same amount of computation time as performing a full receiver-operator characteristic analysis. To avoid stepping through all thresholds to select the minimum double-fault measure, an optimizer may be utilized to determine the minimum double-fault measure value for a combined classifier. The optimizer may estimate the minimum double-fault measure values from corresponding parent classifiers with fewer computations. Depending on the fusion scheme, the corresponding thresholds that provide minimum double-fault measure values for the parent classifiers can be combined to determine the starting threshold that initiates the optimizer. In most of the cases, the threshold that corresponds to the minimum double-fault measure value for the child classifier is about five thresholds above or below the starting threshold. The process can be repeated to compute the minimum double-fault measure values of future child classifiers by storing the threshold values corresponding to minimum double-fault measure values of all current child classifiers across each ground truth data. For ensemble classifiers with only two algorithms in the ensemble, the starting threshold to initiate the minimum double-fault measure optimizer is determined by the thresholds for each parent algorithm's response plane that provide a minimum combined error in terms of false negatives and false positives. For example, the starting threshold may be generated from a first threshold value and a second threshold value stored in a memory. A first binary response plane corresponding to the first parent algorithm is generated by a thresholding operation using the first threshold. A second binary response plane corresponding to the second parent algorithm is generated by a thresholding operation using the second threshold.

For the linear averaging based fusion scheme, the initial starting threshold can be obtained by taking the average of the thresholds that provide minimum double-fault measure values for its respective parent algorithms. With respect to the Naive Bayes based fusion scheme, the starting threshold can be obtained by taking the product of the thresholds that provide the minimum double-fault measure across the parent algorithms/classifiers. For the Dempster-Shafer theory based fusion scheme, the starting threshold can be computed by taking the ratios of the two thresholds (with the greater threshold in the denominator) that provide the minimum double-fault measure for the respective parent algorithms. Due to influence of the mass function across the ignorant class in the Dempster-Shafer theory based fusion calculations, more iterations of the optimizer may be involved in order to find the minimum double-fault measure compared to the linear averaging based fusion scheme and Naive Bayes based fusion scheme. However, in all three cases, experimentation verified that the difference in the minimum double-fault measure values (local minima) determined by the optimization technique described herein was within 0.01% of the minimum double-fault measure value (global minima) calculated throughout the entire range of double-fault measure values. Experimentation also demonstrated that the optimization technique described herein combined with estimating the area under the receiver-operator characteristic curve values provided a computational saving of 83% as compared to performing a direct receiver-operator characteristic analysis, irrespective of the underlying fusion scheme.

Referring again to FIG. 1, the framework 100 comprises a weighting module 130 that provides fusion schemes for algorithm outputs based on, for example, probability-based (naive Bayes classifier), evidence theory-based (Dempster-Shafer theory), rule-based (majority voting) and linear average-based combinations schemes. While the embodiments described herein may comprise any fusion scheme, modified representations of the formulas for linear averaging based fusion scheme, Naive Bayes based fusion scheme and Dempster-Shafer theory based fusion scheme as applied to 2D images (at the pixel level) are provided below for a better understanding of the computation of double-fault measure across response planes within each fusion scheme.

When applying the linear averaging based fusion scheme, the confidence outputs ($S_i$) obtained across different algorithms (i) for a particular region of interest (X) are weighted linearly to provide a final score ($S_f$) according to $$S_f = \frac{\sum_{i=1}^{m}(S_i)}{\sum_{i=1}^{m} i}, \quad (5)$$

where m is the total number of parent algorithm response plane averaged to form the response plane of the resultant classifier (f). In terms of a 2D image, the combined confidence score assigned to each pixel (i, j) is calculated as $$g_{12}(i, j) = \frac{g_1(i, j) + g_2(i, j)}{2} \quad (6)$$

where $g_1(i, j)$ is the confidence score at spatial location (i,j) of the response plane corresponding to the first algorithm, $g_2(i, j)$ is the confidence score at spatial location (i,j) of the response plane corresponding to the second algorithm, and $g_{12}(i, j)$ is the confidence score at spatial location (i,j) of the response plane corresponding to the combined algorithm. The linear averaging based fusion scheme can be extended to combine the output of combined algorithm with another individual algorithm or a different ensemble classifier. Furthermore, it is noted that custom weights that optimize performance for a particular target type can be determined for each of the individual algorithms as opposed to the linear weighting described by equations (5) and (6).

When applying the Naive Bayes based fusion scheme, the combined output confidence values across each pixel (i,j) for the target and non-target class, respectively are calculated as $$g_{12}(i,j) = g_1(i,j) g_2(i,j) \quad (7)$$

and $$r_{12}(i,j) = r_1(i,j) r_2(i,j) \quad (8)$$

where $g_1(i, j)$, $g_2(i, j)$ and $g_{12}(i, j)$ are the probability values for the target class of the first algorithm, the second algorithm and the combined classifier, respectively, and $r_1(i, j)$, $r_2(i, j)$ and $r_{12}(i, j)$ are the probability values for the non-target class of the first algorithm, the second algorithm and the combined classifier, respectively. The Naive Bayes based fusion scheme can be extended to combine the output of the combined classifier with another individual algorithm or a different ensemble classifier.

In the case of a 2D output image obtained by combining the outputs of two individual algorithms by a Dempster-Shafer theory based fusion scheme, the combined output mass function values across each pixel (i,j) for the target, non-target and ignorant class, respectively are calculated as $$g_{12}(i,j) = g_1(i,j) g_2(i,j) + g_1(i,j) b_2(i,j) + g_2(i,j) b_1(i,j) \quad (9),$$

$$r_{12}(i,j) = r_1(i,j) r_2(i,j) + r_1(i,j) b_2(i,j) + g_2(i,j) r_1(i,j) \quad (10), \text{ and}$$

$$b_{12}(i,j) = b_1(i,j) b_2(i,j) + g_1(i,j) r_2(i,j) + g_2(i,j) r_1(i,j) \quad (11)$$

where $g_1(i, j)$, $g_2(i, j)$ and $g_{12}(i, j)$ are the mass functions for the target class of the first algorithm, the second algorithm and the combined classifier, respectively, $r_1(i, j)$, $r_2(i, j)$ and $r_{12}(i, j)$ are the mass functions for the non-target class of the first algorithm, the second algorithm and the combined classifier, respectively, and $b_1(i, j)$, $b_2(i, j)$ and $b_{12}(i, j)$ are the mass functions for the ignorant class of algorithm 1, 2 and combined classifier 12, respectively. The Dempster-Shafer theory based fusion scheme can be extended to combine the output of the combined classifier with another individual algorithm or a different ensemble classifier.

In addition to combining the algorithms through the above described fusion schemes, the individual algorithms within the ensemble classifier may also be weighted. Many of the fusion schemes combine confidence scores of different algorithm response planes in a manner that is at least partially multiplicative in nature. As a result, further multiplication of these individual response planes with their pre-determined weights may decrease the scores across true positive regions of interest as opposed to increasing the scores.

Therefore, the response plane of the algorithms may be weighted exponentially and combined according to the different fusion schemes. For example, two algorithms may be combined according to their respective area under the receiver-operator characteristic curve value. Specifically, the algorithm with the higher area under the receiver-operator characteristic curve value is weighted exponentially by (1-w) and the algorithm with the lower area under the receiver-operator characteristic curve value is weighted exponentially by (w). The exponential weighting is applied before the algorithms are combined to obtain the response plane of their resultant classifier. From a preliminary analysis, the range of weights (between 0 and 1) can be reduced to a range that includes the optimum weight pair for a given relative performance between the parent algorithms/classifiers. This may reduce the number of iterations necessary to determine the specific weight pair (w, 1-w) that will provide the highest area under the receiver-operator characteristic curve value. The exponential weighting scheme was experimentally validated and yielded higher area under the receiver-operator characteristic curve values than combining any confidence interval. Using the exponential weighting approach, the average observed improvement in area under the receiver-operator characteristic curve values was determined to be about 6% (range from about 3 to about 11%).

The combined response plane of a child classifier may vary depending on the weights allotted to the parent algorithms' response plane. To a large extent, the combination schemes are commutative in nature. However, the fusion schemes may yield different child response planes depending upon the combination sequence of the algorithm response plane. The order in which these individual response planes are weighted and combined affects the response of the ensemble classifier. When the number of algorithms is extended beyond two, the number of permutations of parent algorithm response plane order combinations increases exponentially. To efficiently optimize the performance of the child classifiers, the selection and ordering of parent algorithm responses can be based upon a ranking of their corresponding area under the receiver-operator characteristic curve value (with highest performers going first). For example, assume that four algorithms P, Q, R and S are ranked in order of highest area under the receiver-operator characteristic curve value (i.e., P has the highest value and S the lowest). The response planes of individual algorithms P and Q are weighted and combined first to obtain a response plane of an intermittent classifier PQ. The process is repeated by again ranking the two best performing parent algorithms. The best performing parent algorithms may include one of the remaining individual algorithms (here R or S) or one of the intermittent classifiers from previous steps (here, PQ). For example, if the intermittent classifier PQ is ranked highest then the next combination will be PQ and R. Finally, the method terminates when the response plane of all parent algorithms and their intermittent classifiers that together form the candidate child classifier (here, PQRS) are combined using the same approach.

The embodiments described herein may utilize fusion schemes such as the linear average classifier, majority voting, rule-based method, schemes based on naive Bayes theory and Dempster-Shafer theory. Such fusion schemes may be extended to various fields such as, for example, medical image analysis (e.g., MRI image segmentation or computer-aided detection systems), ATR (e.g., landmine detection or military target detection) and pattern recognition problems (e.g., finger print recognition or handwriting recognition).

Referring again to FIG. 1, the framework 100 comprises a cost function analysis module 140 that identifies the best obtainable combination scheme that provides minimal cost in terms of misses and false positives. The cost function analysis module 140 aids the assessment of the different candidate sensors (monomodal or multimodal imagers) for a given detection task based on the selected algorithm ensembles/combination schemes (overall misses and false positives) and also the associated hardware expenditure. Features such as flexibility, affordability, time-effectiveness and accuracy are considered during the cost function analysis.

The performance of the overall system is inherently determined by the nature of incorporated algorithms. Therefore, even with fine tuning of the parameters of algorithms with respect to a particular target, there is always a limit to the improvement in the ensemble performance if the algorithms are not truly independent in nature. A substantial improvement in system performance can be achieved by replacing the most dependent classifier of the ensemble with a less dependent classifier. In this sense, the process of optimizing a system's performance is dynamic and the system may be flexible to readily incorporate and/or eliminate algorithms.

Detection systems may be mounted on a large number of troop vehicles and, therefore, should be economic. The choice of imaging modalities is limited by the overhead and the investment cost of hardware for applications such as, for example, battlefield surveillance or ground-based improvised explosive device detection. The decision to incorporate a specific sensor may be made based on a preliminary analysis of the detection outputs obtained for a broad range of sensor-specific training images.

There is a limit to the number of computations that a detection system can perform based on cost or time efficiency. The limit may be determined by the threshold set on the required true detection rate and the acceptable number of false positive for any given system. Cost function analysis (cost function) quantifies the costs of a miss and a false alarm. The true detection rate, or sensitivity, can be improved by lowering the threshold of a given algorithm such that it correctly detects all regions of interest. In these scenarios, even though all the targets in an image are detected by the system, background objects that have some common features with the targets are also falsely identified as targets. As a result, high sensitivity commonly comprises a cost of a high false detection rate (1-specificity). This trade-off between sensitivity (target likelihood) and specificity (non-target likelihood) can challenge to the development of high performance detection algorithms. Acceptable levels of sensitivity and 1-specificity are generally application specific. For example, high sensitivity may be desirable despite the corresponding false detection rate in the medical field to detect cancer cells or screen patients with an illness, in the military arena to detect missiles or landmines, and in the pattern recognition field to detect new patterns or symbols. In a war scenario, it may be more important to save innocent lives (i.e., reject false positive) than destroy enemy artillery (i.e., detect true positive) unless decided otherwise based on a risk versus benefit analysis. Therefore, the fundamental aim of the cost function analysis module 140 is to evaluate algorithms based on the above described trade-offs to achieve the highest possible performance.

Figure 4:
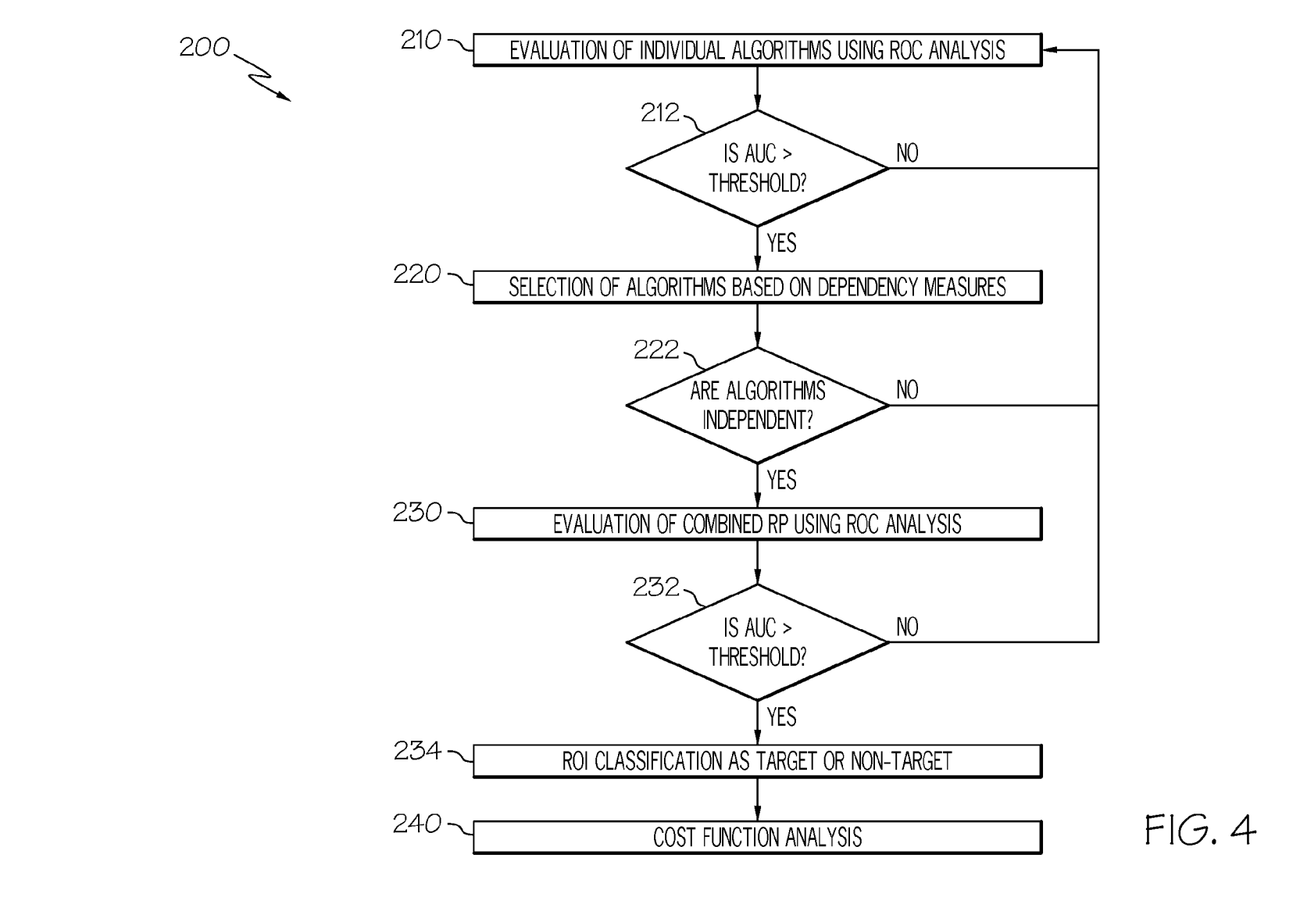
FIG. 4 schematically depicts a method for the autonomous generation of an ensemble classifier according to one or more embodiments shown and described herein.

Referring now to FIG. 4, a method 200 for generating an ensemble classifier is depicted. At process 210, individual algorithms are evaluated using the receiver-operator characteristic analysis described herein. The individual algorithms may comprise feature finding algorithms and secondary classifiers. The feature finding algorithms are commonly used across different detection tasks to extract shape (solidity, convex hull, Fourier descriptors, etc.), size (area, perimeter, etc.), statistics (variance, entropy, etc.) or texture (coarseness, regularity, line-likeness, etc.) based signatures from desired regions of interest. The results of feature finding algorithms are considered primary algorithms as their results are further processed by secondary classifiers such as neural networks, k-nearest neighbor and support vector machines, which finally classify a given regions of interest.

The method 200 or portions of the method 200 may be executed by a processor. The processor may be an integrated circuit, a microchip, a computer, or any other computing device capable of executing machine readable instructions. The processor may be communicably coupled to a machine readable medium for storing electronic data. The machine readable medium may be RAM, ROM, a flash memory, a hard drive, or any device capable of storing machine readable instructions. Thus, embodiments of the present disclosure may comprise logic or an algorithm written in any programming language of any generation (e.g., 1GL, 2GL, 3GL, 4GL, or 5GL) such as, e.g., machine language that may be directly executed by the processor, or assembly language, object-oriented programming (OOP), scripting languages, microcode, etc., that may be compiled or assembled into machine readable instructions and stored on a machine readable medium. Alternatively, the logic or algorithm may be written in a hardware description language (HDL), such as implemented via either a field-programmable gate array (FPGA) configuration or an application-specific integrated circuit (ASIC), and their equivalents.

At process 212, the area under the receiver-operator characteristic curve determined for each of the individual algorithms is compared to a performance threshold. If the area under the receiver-operator characteristic curve is below the performance threshold value, process 210 may be repeated for the individual algorithms such as, for example, by adding new algorithms or by fine tuning the parameters of the existing algorithms. If a suitable number of algorithms comprise an area under the receiver-operator characteristic curve greater than the performance threshold, the method 200 may proceed to the following process.

At process 220, the dependency metrics for combinations of the individual algorithms is determined, as described in greater detail above. Once the dependencies have been determined a check for independence is performed at process 220. If the algorithms are not independent, process 210 may be repeated. At process 230, the individual algorithms are combined into an ensemble classifier according to a given fusion scheme with desired weighting (if required). The ensemble classifier may then be evaluated using the receiver-operator characteristic curve analysis.

At process 232, a determination is made as to whether the area under the receiver-operator characteristic curve for the ensemble classifier is greater than a desired threshold. If the ensemble classifier fails to meet the threshold, process 210 may be repeated (i.e., fine-tune existing algorithms or add new individual algorithms to the pool). At process 234, the ensemble classifier is utilized to classify regions of interests (e.g., in training data and/or test data). Finally, at process 234, a cost function analysis may be utilized to determine if the ensemble classifier is suitable for deployment.

In order to provide further clarity without limiting the scope of the embodiments described herein, the following example case study is provided.

The images for the case study were acquired in collaboration with the Battle space Visualization Laboratories of the Air Force Research Laboratory (AFRL), Dayton, Ohio. A preliminary image set was comprised of images of 4'×8', 1:700 scaled terrain boards that replicate different battle space scenes such as desert, treed and urban environments. Images were acquired using a commercial digital camera under multiple board angles, camera angles and light positions to most realistically represent the complexity of the detection task. Target objects (Scud missile launcher replicas)

were placed at various positions under differing orientations on the terrain board. Additionally, a few targets in every scene were partially occluded to add more realism.

Referring again to FIG. 2, ground truth data 150 included targets 152 (Scud launchers encircled in FIG. 2). A target square object was identified interactively through a graphical user interface and the graphical user interface was used for identifying additional target square objects. Based on the information provided, such as image size, target size and location, the receiver-operator characteristic algorithm divided the entire input image into grid squares.

Referring to FIGS. 2, 3A and 3B collectively, the grid squares 162 form the number of non-targets, including the background, in a given scene. The area of a grid square 162 overlaying a target 152 was ignored (turned 'off') for computation of false positives, and created the true negative template image 160. The appropriately-sized masks were utilized at target 152 locations to form the true positive template image 170.

The size of the grid square 162 was determined such that the computed specificities reflect the change in response plane as a function of the decision thresholds. The size of the optimal true negative grid square size was dependent on both image and target size. The lower limit was equal to the target size to allow equal weighting of true negative and true positive responses in terms of area and to avoid sampling-based errors. The upper limit was dependent upon the image size such that a change in specificity is reflected by a change in decision threshold. For evaluation of the automated target detection imagery, a grid square side of 80 pixels was determined as optimum with respect to the 18 evaluation images of size 1500×1000 pixels and a target size of approximately 50×50 pixels (FIG. 2). All subsequent parameter optimization and evaluations of detection algorithms were performed under this constant grid square size. In practice, the camera-to-scene distance is presumed to be known along with the size of the actual targets, and so both object size (in pixels) and image size would be known a priori.

The results of the Dempster-Shafer theory based fusion scheme were significantly better than the linear averaging based fusion scheme for the given detection system. The maximum specificity and sensitivity achieved by Dempster-Shafer theory based fusion scheme response plane were higher than that for the linear average scheme and majority voting. However, the trend need not be same for a new detection task. Therefore, the linear average and majority voting schemes should not be eliminated as potential fusion models within the framework. Although the variance-based detection algorithm was the second best algorithm in the ensemble, its combination with other algorithms did not provide a significant improvement in overall performance, due to an increase in the overlap of false positives common to other individual algorithms. Similarly, although the histogram-based detection algorithm outperformed shape-based detection in terms of sensitivity, its performance as a team player was worse due to its low specificity, and the histogram-based detection method was excluded from the final ensemble. The need to combine the least dependent algorithms was substantiated by the subsequent evaluation of the double-fault measure with respect to the combined-area under the receiver-operator characteristic curve values across the 26 possible ensembles.

Compared to other pair-wise diversity metrics, the double-fault measure correlated best with the combined area under the receiver-operator characteristic curve. The results were consistent for both the Dempster-Shafer theory based fusion scheme and linear averaging based fusion scheme and indicated the independence of all the diversity metrics with respect to the combination scheme. Further, the rank order of the diversity metrics was the same for the Dempster-Shafer theory based fusion scheme and linear averaging based fusion scheme. Table 1 below summarizes the results of the case study with respect to various diversity measures.

TABLE 1

| Diversity Measure | Correlation with Dempster-Shafer theory based fusion scheme area under the receiver-operator characteristic curve values | Correlation with linear averaging based fusion scheme area under the receiver-operator characteristic curve values |
|---|---|---|
| Double-fault | −0.80 | −0.72 |
| Product moment correlation | −0.58 | −0.67 |
| Correlation coefficient | −0.38 | −0.50 |
| Q statistics | −0.20 | −0.28 |
| Disagreement measure | 0.04 | 0.11 |

Although the framework is described in terms of an automatic target detection system, the embodiments described herein can be extended to any set of images and multiple targets. The receiver-operator characteristic analysis described herein provides an efficient way for identifying algorithms suited for a given detection task. Further, the area under the receiver-operator characteristic curve metric can also be used to compare the performances of various algorithm ensembles combined under different combination schemes.

It should now be understood that ensemble classifiers may be generated according to the methods and logic described herein and incorporated into systems to detect an improvised explosive device (hereinafter IED). The task of IED detection may be more complicated than automated target recognition problems, due to the obscurity of IEDs which may be constructed to look like everyday objects. Consequently, a roadside IED could share visual characteristics with a beverage can, a concrete slab or an animal carcass placed along the roadside. Roadside imagery may be captured under all illumination conditions using a vehicle-mounted multimodal imaging system, i.e., a system that combines multiple sensors for capturing images (such as electro-optic, short-wave infrared, midwave infrared and long-wave infrared), sound, temperature, and the like. Additionally, the system may comprise sensors suited for a given ambient lighting condition (e.g., dawn, daylight, dusk and night). The sensor data may be evaluated with heuristic data to produce ground truth data for generating/validating an ensemble classifier. Once generated, the ensemble classifier may be stored on memory communicably coupled with a processor and the sensors and operate to detect IED's. Here, detection of IEDs is given as an example of different classification tasks that can also be accomplished using the proposed methods/logic.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for generating an ensemble classifier, the method comprising:
transforming, automatically with a processor, multidimensional training data into a plurality of response planes according to a plurality of recognition algorithms, wherein each of the response planes comprise a set of confidence scores;
transforming, automatically with the processor, the response planes into a plurality of binary response planes, wherein each of the binary response planes comprise a set of binary scores corresponding to one of the confidence scores;
transforming, automatically with the processor, a first combination of the binary response planes into a first set of diversity metrics according to a first diversity measure;
transforming, automatically with the processor, a second combination of the binary response planes into a second set of diversity metrics according to a second diversity measure;
selecting a first metric from the first set of diversity metrics;
selecting a second metric from the second set of diversity metrics;
generating, automatically with the processor, a predicted performance of a child combination of the recognition algorithms corresponding to the first combination and the second combination, wherein the predicted performance is based at least in part upon the first metric and the second metric;
selecting parent recognition algorithms from the recognition algorithms based at least in part upon the predicted performance; and
generating the ensemble classifier, wherein the ensemble classifier comprises the parent recognition algorithms.

2. The method of claim 1, further comprising:
identifying a target square object within the multidimensional training data, wherein the multidimensional training data is two-dimensional;
dividing the multidimensional training data into grid squares;
generating a true negative template image, the true negative template image comprising the grid squares excluding the target square object; and
generating a true positive template image, the true positive template image comprising the target square object.

3. The method of claim 2, further comprising:
identifying additional target square objects within the multidimensional training data; and
optimizing, automatically with the processor, a grid square dimension, wherein a starting point for optimizing is an average dimension of the target square object and additional target square objects.

4. The method of claim 2, further comprising calculating a sensitivity, wherein the sensitivity is based at least in part upon an overlap between one of the binary response planes and the true positive template image.

5. The method of claim 2, further comprising calculating a specificity, wherein the specificity is based at least in part upon a total number of the grid squares and an overlap between one of the binary response planes and the true negative template image.

6. The method of claim 1, further comprising applying weights to the recognition algorithms of the ensemble classifier, wherein the ensemble classifier is less dependent upon an underlying fusion scheme.

7. The method of claim 6, wherein the weights are exponential values and the weights are applied automatically by the processor.

8. The method of claim 1, further comprising quantifying a cost function of the ensemble classifier.

9. The method of claim 8, wherein the cost function is based upon a false negative, a false positive, a target likelihood, a non-target likelihood, or a combination thereof.

10. The method of claim 1, wherein the predicted performance is an output from a quadratic model.

11. The method of claim 1, wherein the first diversity measure is a double fault dependency metric.

12. The method of claim 11, wherein the first metric is a minimum of the first set of diversity metrics.

13. The method of claim 12, further comprising storing a threshold value in a memory, wherein one of the confidence scores is transformed to one of the binary scores by a thresholding operation based at least in part upon the threshold value and the threshold value corresponds to the first metric.

14. The method of claim 1, wherein:
the first metric is selected by an optimizer executed by the processor;
the first combination of the binary response planes comprises a first binary response plane and a second binary response plane;
one of the response planes is transformed to the first binary response plane based at least in part upon a first threshold value;
one of the response planes is transformed to the second binary response plane based at least in part upon a second threshold value; and
a starting threshold utilized by the optimizer is equal to an average of the first threshold value and the second threshold value.

15. The method of claim 1, wherein:
wherein the first metric is selected by an optimizer executed by the processor;
the first combination of the binary response planes comprises a first binary response plane and a second binary response plane;
one of the response planes is transformed to the first binary response plane based at least in part upon a first threshold value;
one of the response planes is transformed to the second binary response plane based at least in part upon a second threshold value; and
a starting threshold utilized by the optimizer is equal to a product of the first threshold value and the second threshold value.

16. The method of claim 1, wherein:
the first metric is selected by an optimizer executed by the processor;
the first combination of the binary response planes comprises a first binary response plane and a second binary response plane;
one of the response planes is transformed to the first binary response plane based at least in part upon a first threshold value;
one of the response planes is transformed to the second binary response plane based at least in part upon a second threshold value; and a starting threshold utilized by the optimizer is equal to a ratio of the first threshold value and the second threshold value, such that a largest of the first threshold value and the second threshold value is a denominator.

17. The method of claim 1, further comprising ranking the response planes according to an area under a receiver-operator characteristic curve.

* * * * *

UNITED STATES PATENT AND TRADEMARK OFFICE
CERTIFICATE OF CORRECTION

PATENT NO. : 8,582,871 B2  
APPLICATION NO. : 12/898916  
DATED : November 12, 2013  
INVENTOR(S) : Julie A. Skipper et al.

Page 1 of 1

It is certified that error appears in the above-identified patent and that said Letters Patent is hereby corrected as shown below:

In the Specification

Col. 3, Line 37,
"dency assessment module that assess interdependencies" should read
--dency assessment module that assesses interdependencies--;

Col. 8, Line 35,
"rithm outputs based on, for example, probability-based (naive" should read
--rithm outputs based on, for example, probability-based (Naive--;

Col. 10, Line 53,
"rule-based method, schemes based on naive Bayes theory and" should read
--rule-based method, schemes based on Naive-Bayes theory and--;

Col. 12, Line 59,
"tion with the Battle space Visualization Laboratories of the" should read
--tion with the Battle Space Visualization Laboratories of the--; and Col. 14, Line 52,
"detect IED's. Here, detection of IEDs is given as an example" should read
--detect IEDs. Here, detection of IEDs is given as an example--.

Signed and Sealed this  
Twenty-fourth Day of February, 2015

Michelle K. Lee  
*Deputy Director of the United States Patent and Trademark Office*